United States Patent
Katayama

(10) Patent No.: US 11,095,821 B2
(45) Date of Patent: Aug. 17, 2021

(54) FOCUS CONTROL APPARATUS AND METHOD GENERATING AND UTILIZING DISTANCE HISTOGRAM FOR SELECTION AND SETTING OF FOCUS AREA

(71) Applicant: CANON KABUSHIKI KAISHA, Tokyo (JP)

(72) Inventor: Tatsushi Katayama, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 162 days.

(21) Appl. No.: 15/800,708

(22) Filed: Nov. 1, 2017

(65) Prior Publication Data

US 2018/0070006 A1 Mar. 8, 2018

Related U.S. Application Data

(63) Continuation of application No. 15/004,271, filed on Jan. 22, 2016, now Pat. No. 9,832,361.

(30) Foreign Application Priority Data

Jan. 23, 2015 (JP) .................................. 2015-011574

(51) Int. Cl.
    *H04N 5/232* (2006.01)
    *H04N 5/222* (2006.01)

(52) U.S. Cl.
    CPC ..... *H04N 5/232933* (2018.08); *H04N 5/2226* (2013.01); *H04N 5/23212* (2013.01);
    (Continued)

(58) Field of Classification Search
    CPC ........... H04N 5/23212; H04N 5/23216; H04N 5/2628; H04N 5/23293; H04N 5/2226;
    (Continued)

(56) References Cited

U.S. PATENT DOCUMENTS

2007/0206108 A1* 9/2007 Nozawa ............... H04N 1/6086
348/333.01
2012/0105590 A1 5/2012 Fukumoto et al.
(Continued)

FOREIGN PATENT DOCUMENTS

JP 2005-078009 A 3/2005
JP 2010-093422 A 4/2010
(Continued)

OTHER PUBLICATIONS

The above foreign patent document was cited in the Oct. 16, 2018 Japanese Office Action, a copy of which is enclosed without an English Translation, that issued in the Japanese Patent Application No. 2015011574.

(Continued)

*Primary Examiner* — Albert H Cutler
(74) *Attorney, Agent, or Firm* — Cowan, Liebowitz & Latman, P.C.

(57) ABSTRACT

An imaging apparatus includes an imaging optical system, an imaging element acquiring an image of an object, a unit that acquires distance information corresponding to distance between the imaging optical system and the object, a unit that generates a map information corresponding to the image based on the distance information, a unit that is able to detect touch operation of a user on a display unit displaying the image and that detects a position in the image corresponding to a position touched by the user, and a control unit configured to acquire the distance information at the position of the acquired image from the map information to set the position as a focus point according to the acquired distance information, or configured to display, on the display unit, an enlarged image obtained by cutting an area of part of the image including the position.

9 Claims, 11 Drawing Sheets

(52) U.S. Cl.
CPC ..... *H04N 5/23216* (2013.01); *H04N 5/23293* (2013.01); *H04N 5/232127* (2018.08); *H04N 5/232945* (2018.08)

(58) Field of Classification Search
CPC ....... H04N 5/232933; H04N 5/232945; H04N 5/232127; G06K 9/4642
See application file for complete search history.

(56) References Cited

U.S. PATENT DOCUMENTS

| | | |
|---|---|---|
| 2013/0004082 A1 | 1/2013 | Kano et al. |
| 2013/0083222 A1 | 4/2013 | Matsuzawa et al. |
| 2013/0201206 A1* | 8/2013 | Bryant ................ H04N 1/407 345/600 |
| 2014/0185870 A1 | 7/2014 | Yoshida |
| 2014/0354781 A1* | 12/2014 | Matsuyama ....... H04N 5/23212 348/49 |
| 2015/0189154 A1 | 7/2015 | Laroia et al. |
| 2016/0127636 A1 | 5/2016 | Ito et al. |

FOREIGN PATENT DOCUMENTS

| | | |
|---|---|---|
| JP | 2012-145813 A | 8/2012 |
| JP | 2013-093754 A | 5/2013 |
| JP | 2013-142725 A | 7/2013 |

OTHER PUBLICATIONS

The above foreign patent documents were cited in the Jan. 21, 2020 Japanese Office Action, a copy of which is enclosed without an English Translation, that issued in Japanese Patent Application No. 2018234292.

* cited by examiner

FOCUS CONTROL APPARATUS AND METHOD GENERATING AND UTILIZING DISTANCE HISTOGRAM FOR SELECTION AND SETTING OF FOCUS AREA

CROSS-REFERENCE TO RELATED APPLICATION

This application is a continuation of application Ser. No. 15/004,271, filed Jan. 22, 2016, the entire disclosure of which is hereby incorporated by reference.

BACKGROUND OF THE INVENTION

Field of the Invention

The present invention relates to an imaging apparatus and a method of controlling the imaging apparatus.

Description of the Related Art

Conventionally, a technique of pressing a display screen to set a focus area (hereinafter, also referred to as "AF point" or "focus point") is proposed in an imaging apparatus including a liquid crystal display panel provided with a touch panel. In Japanese Patent Application Laid-Open No. 2005-078009, an area of part of an acquired image is enlarged and displayed to check the focus of the set AF point.

However, when the AF point is designated by a finger on the screen of the imaging apparatus, an intended object is not focused, or perspective conflict occurs in some cases. Although the AF point can be enlarged to check the focus in the technique described in Japanese Patent Application Laid-Open No. 2005-078009, the entire screen needs to be displayed again if the intended part is not focused.

In recent years, a method of enlarging an image by identifying operation of spreading two fingers touching the image in multi-touch operation is widely used. However, performing the multi-touch operation while using the imaging apparatus during imaging is difficult, and setting the AF point at a desired object position is troublesome.

SUMMARY OF THE INVENTION

An object of the present invention is to provide an imaging apparatus and a method of controlling the imaging apparatus that can accurately focus an object intended by a user with simpler operation.

According to one aspect of the present invention, there is provided an imaging apparatus including an imaging optical system that forms an optical image of an object, an imaging element that acquires an image of the object from the optical image, a distance information acquiring unit that acquires distance information which is corresponding to distance between the imaging optical system and the object, map generation unit that generates map information corresponding to the image based on the distance information, a position detection unit that is able to detect touch operation of a user on a display displaying the image and that detects a position in the image corresponding to a position touched by the user, and a control unit configured to acquire the distance information at the position of the acquired image from the map information to set the position as a focus point according to the acquired distance information, or configured to display, on the display unit, an enlarged image obtained by cutting an area of part of the image including the position.

According to another aspect of the present invention, there is provided a method of controlling an imaging apparatus including an imaging optical system that forms an optical image of an object, an imaging element that acquires an image of the object from the optical image, a distance information acquiring unit that acquires distance information which is corresponding to distance between the imaging optical system and the object, and a position detection unit that is able to detect touch operation of a user on a display unit displaying the image, the method including generating a map information corresponding to the image based on the acquired distance information, displaying the acquired image on the display unit, detecting the touch operation of the user on the display unit to acquire a position in the image corresponding to a position touched by the user, acquiring the distance information at the position of the acquired image from the map information, and setting the position as a focus point according to the acquired distance information, or displaying, on the display unit, an enlarged image obtained by cutting an area of part of the image including the position.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawing.

First Embodiment

An imaging apparatus and a method of driving the imaging apparatus according to a first embodiment of the present invention will be described with reference to FIGS. 1 to 10B.

Figure 1:
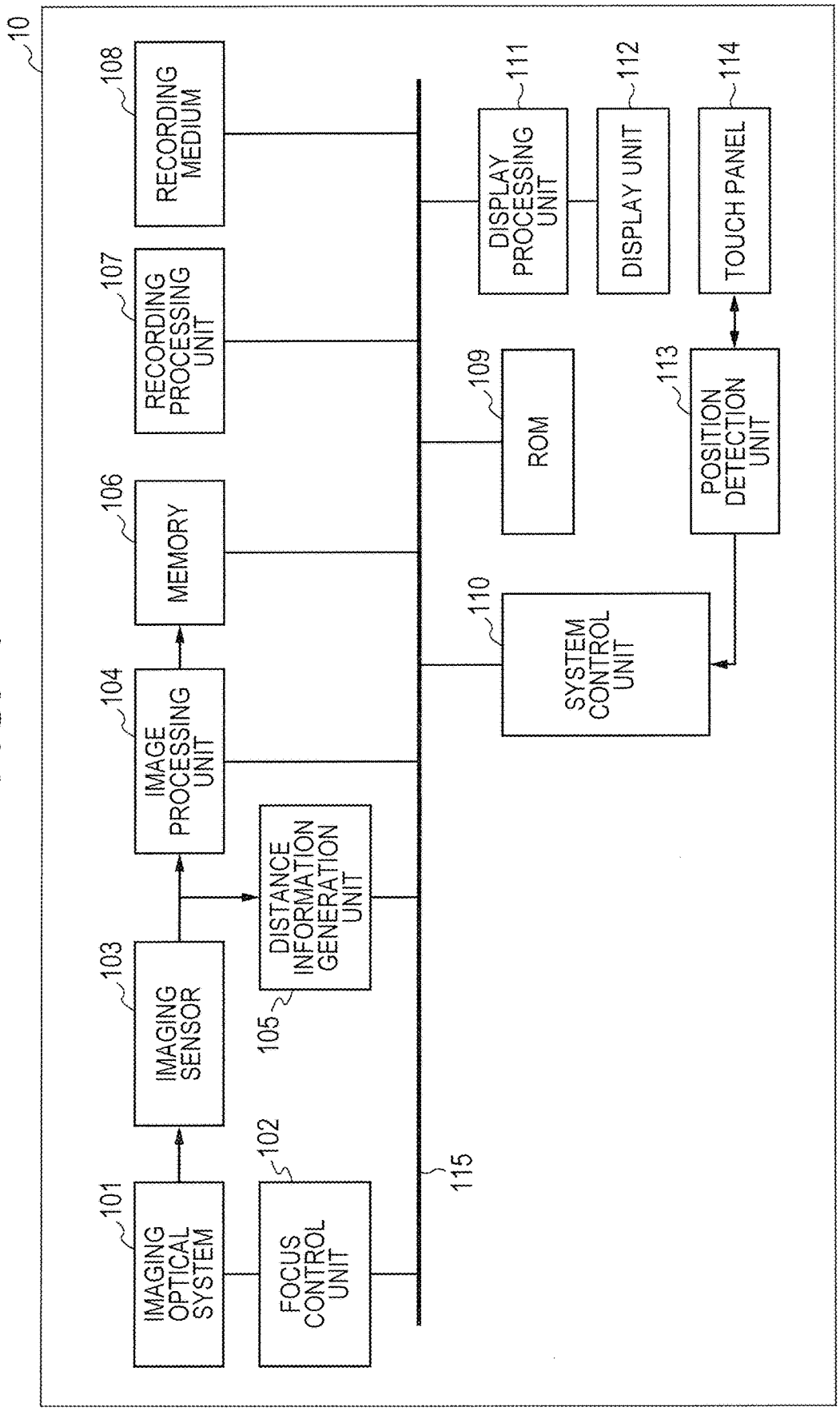
FIG. 1 is a block diagram illustrating configuration of an imaging apparatus according to a first embodiment of the present invention.
Figure 2A:
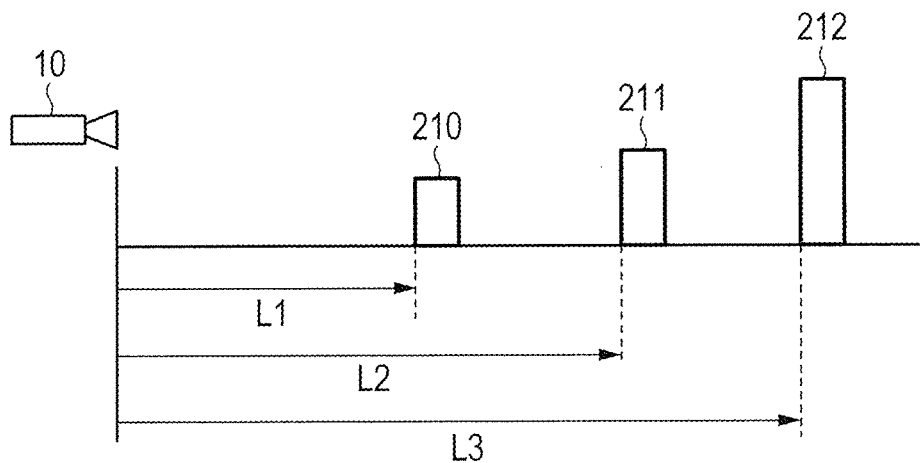
FIGS. 2A and 2B are diagrams describing distance map used in the imaging apparatus according to the first embodiment of the present invention.
Figure 2B:
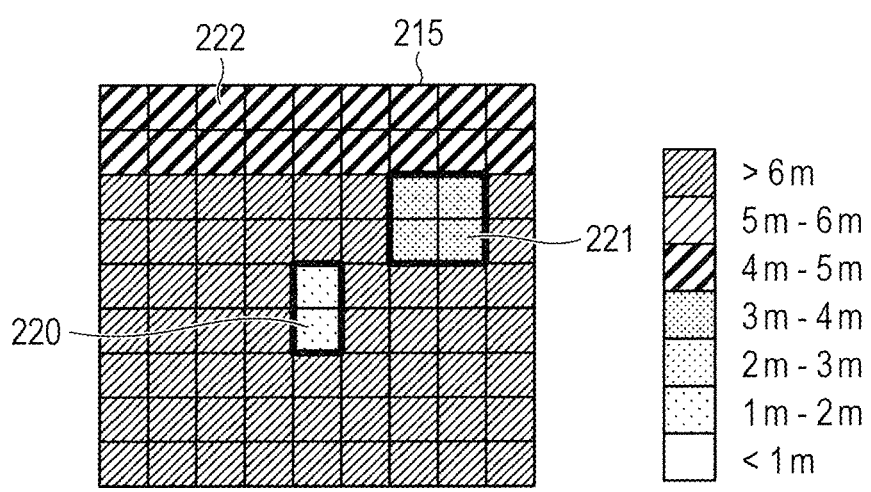
Figure 3:
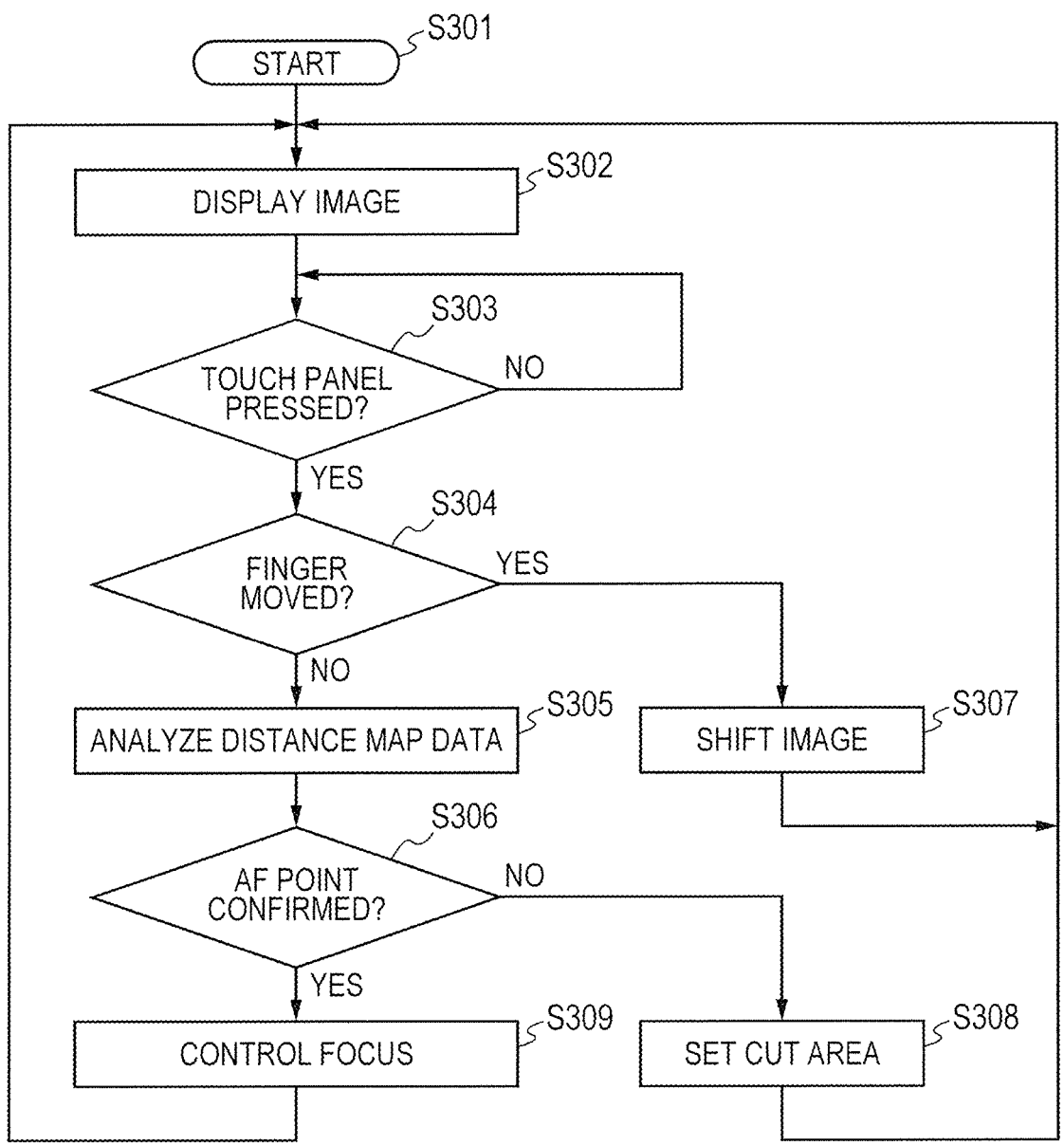
FIG. 3 is a flow chart illustrating a method of controlling the imaging apparatus according to the first embodiment of the present invention.
Figure 4A:
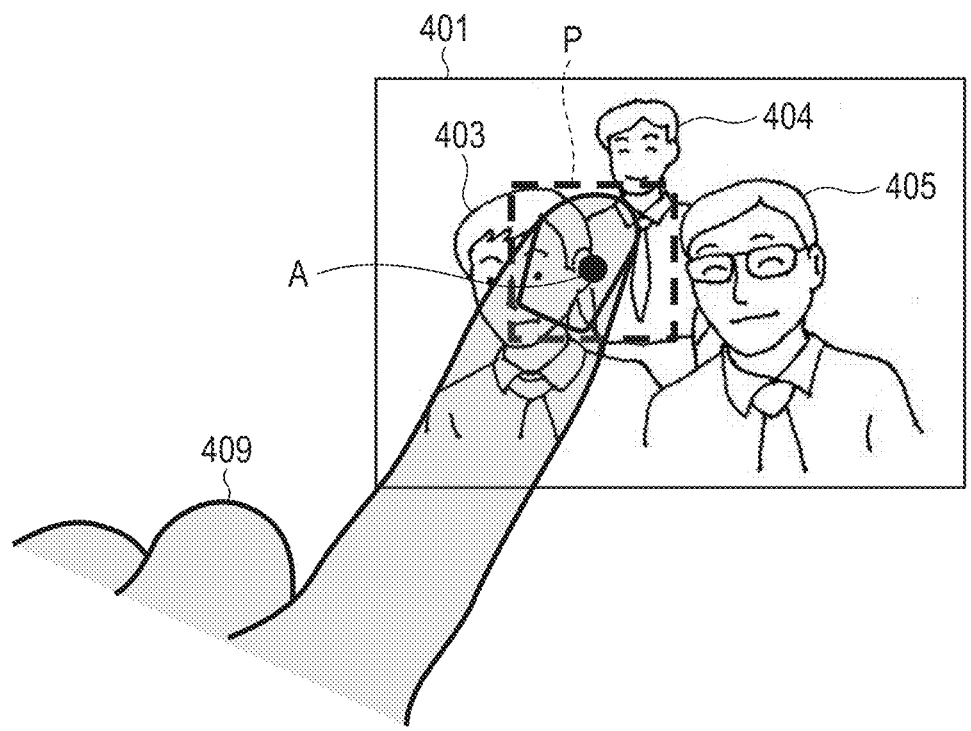
FIGS. 4A and 4B are diagrams describing election method of an AF point in the method of controlling the imaging apparatus according to the first embodiment of the present invention.
Figure 4B:
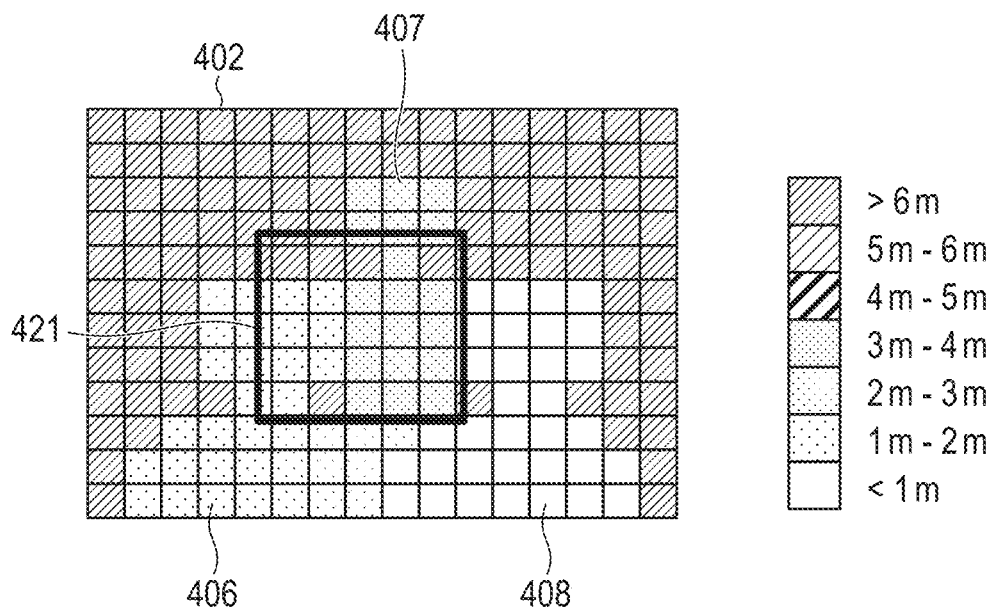
Figure 5:
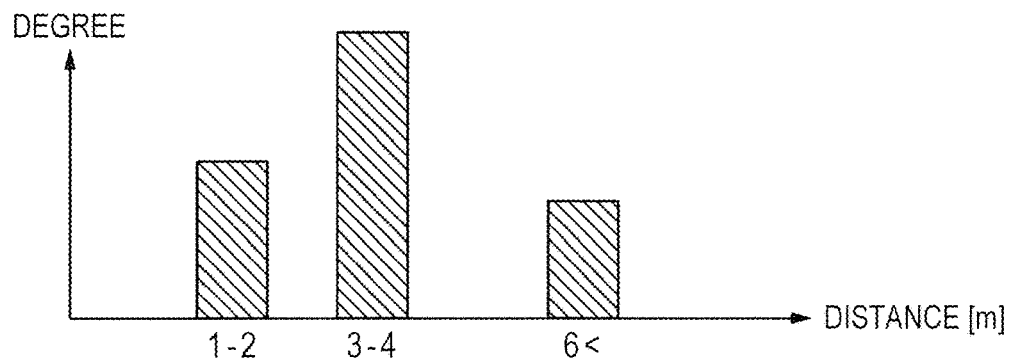
FIG. 5 is a diagram describing a distance histogram used in the imaging apparatus according to the first embodiment of the present invention.
Figure 6A:
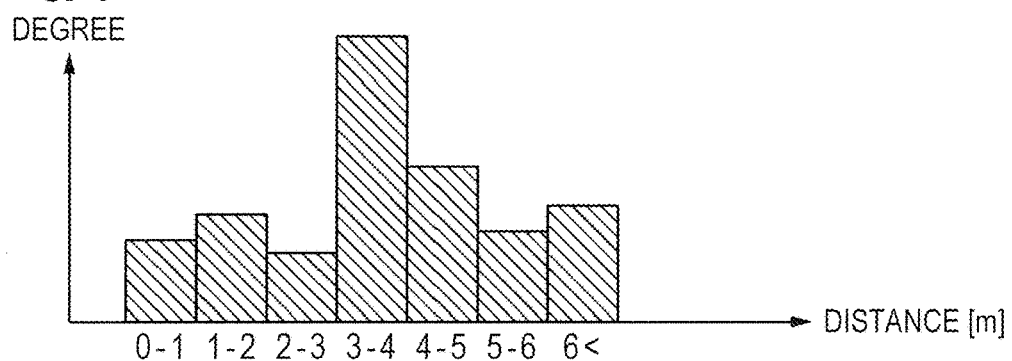
FIGS. 6A, 6B and 6C are diagrams describing types of peak patterns of the distance histogram.
Figure 6B:
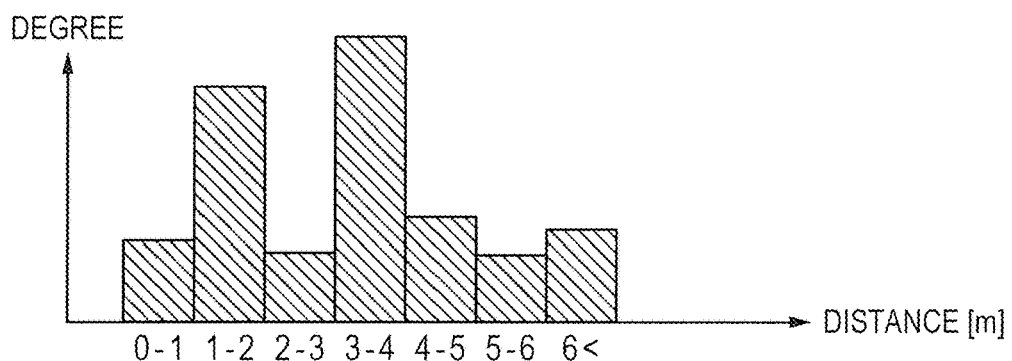
Figure 6C:
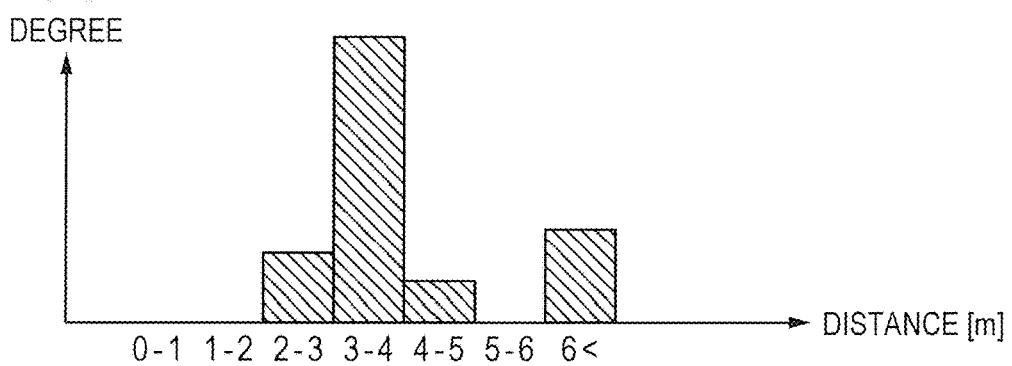
Figure 7:
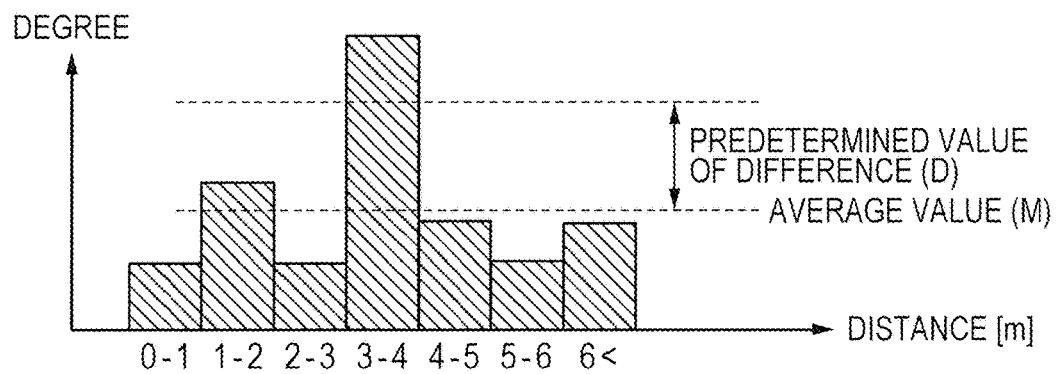
FIG. 7 is a diagram describing an example of a d of detecting a peak of the distance histogram.
Figure 8A:
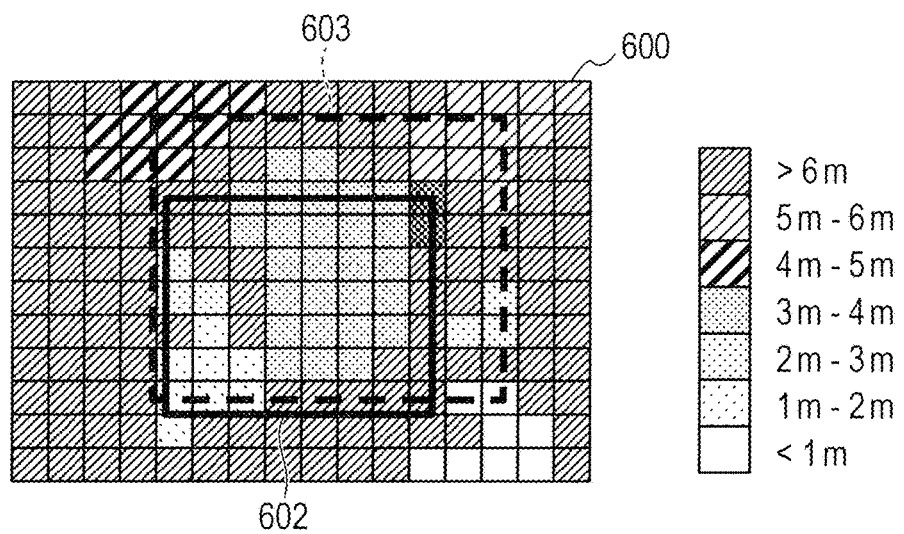
FIGS. 8A and 8B are diagrams describing an enlargement process of an image when the distance histogram indicates a single peak pattern.
Figure 8B:
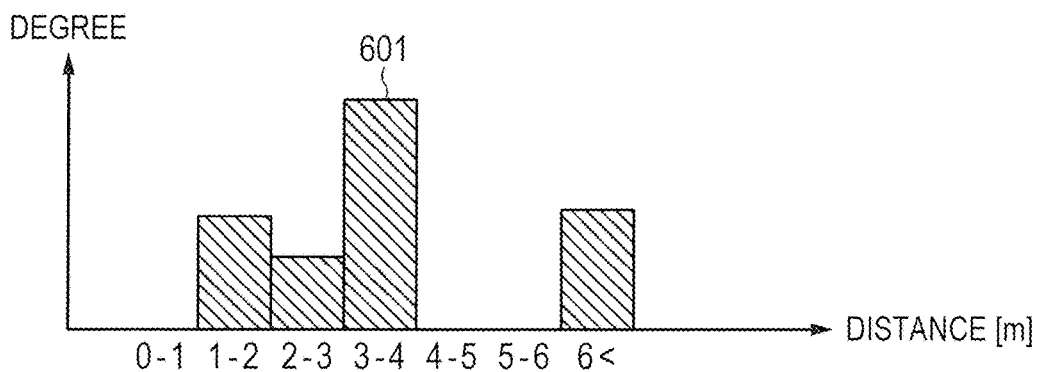
Figure 9A:
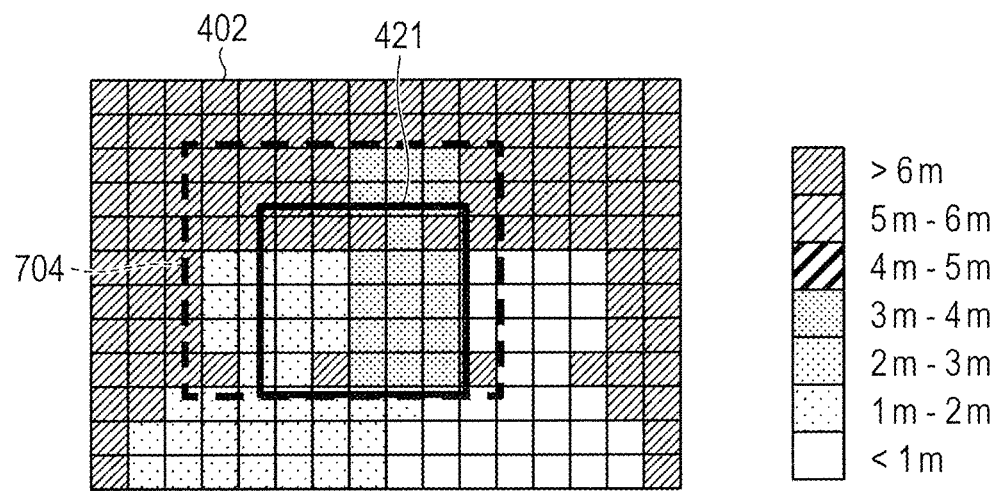
FIGS. 9A and 9B are diagrams describing an enlargement process of an image when the distance histogram indicates a multi-peak pattern.
Figure 9B:
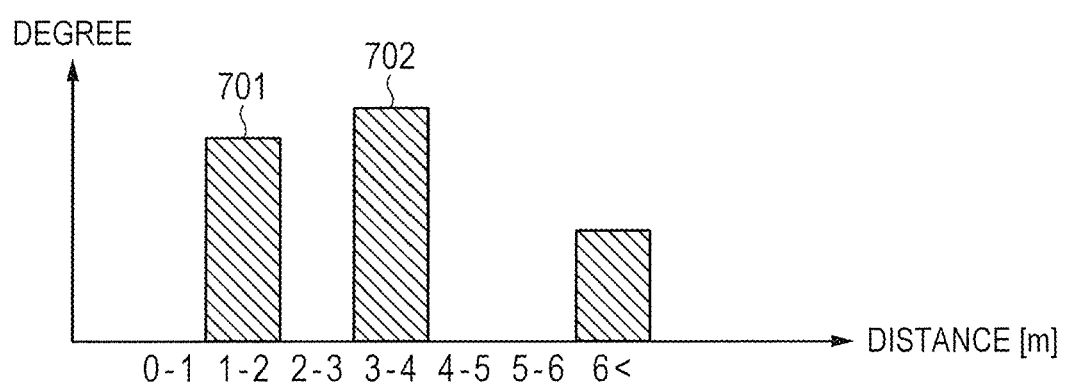
Figure 10A:
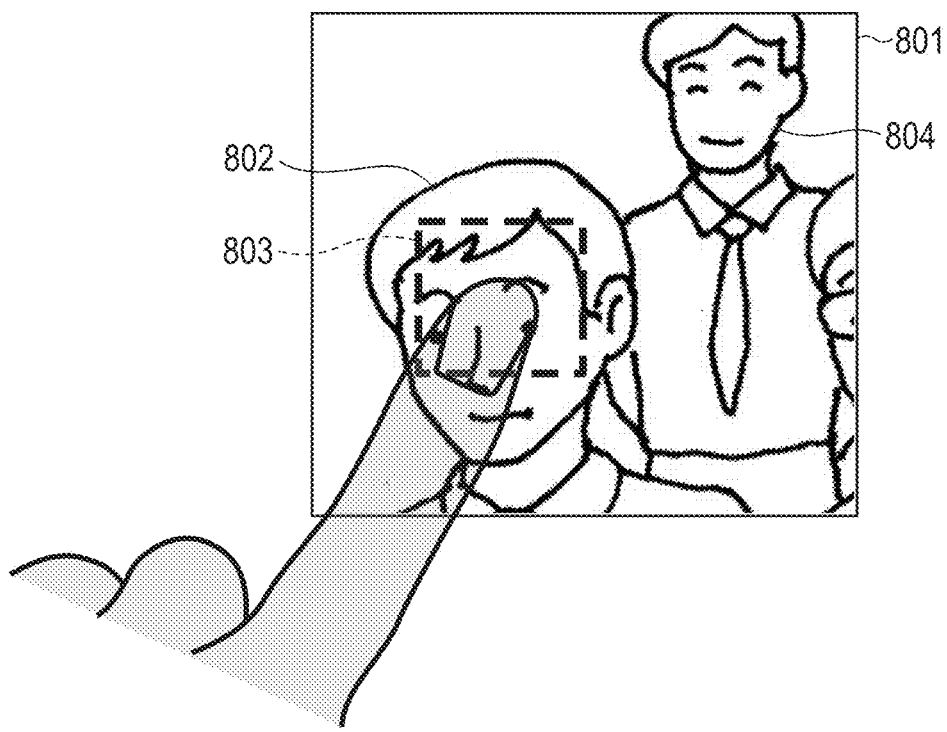
FIGS. 10A and 10B are diagrams describing a selection method of an AF point from an enlarged image in the method of controlling the imaging apparatus according to the first embodiment of the present invention.
Figure 10B:
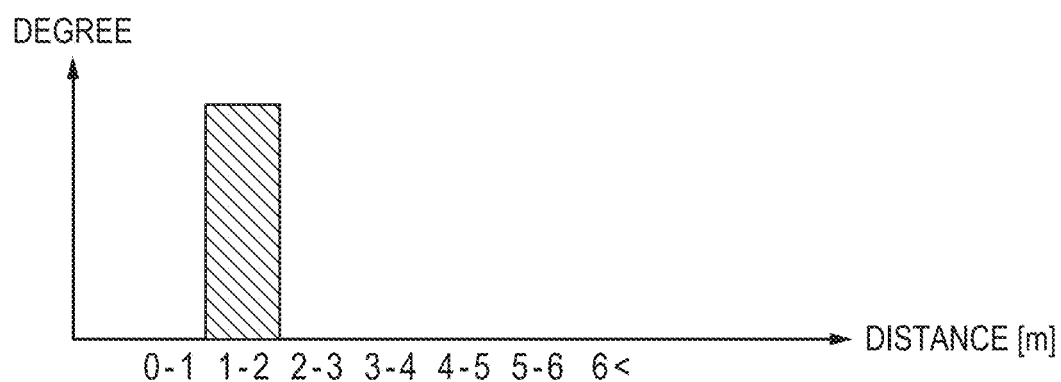

FIG. 1 is a block diagram illustrating configuration of the imaging apparatus according to the present embodiment. FIGS. 2A and 2B are diagrams describing a distance map used in the imaging apparatus according to the present embodiment. FIG. 3 is a flow chart showing operation of the imaging apparatus according to the present embodiment. FIGS. 4A and 4B are diagrams describing a selection method of an AF point in a method of controlling the imaging apparatus according to the present embodiment. FIG. 5 is a diagram describing a distance histogram used in the imaging apparatus according to the present embodiment. FIGS. 6A to 6C are diagrams describing types of peak patterns of the distance histogram. FIG. 7 is a diagram describing an example of a method of detecting a peak of the distance histogram. FIGS. 8A and 8B are diagrams describing an enlargement process of an image when the distance histogram indicates a single peak pattern. FIGS. 9A and 9B are diagrams describing an enlargement process of an image when the distance histogram indicates a multi-peak pattern. FIGS. 10A and 10B are diagrams describing a selection method of the AF point from an enlarged image in the method of controlling the imaging apparatus according to the present embodiment.

First, a structure of the imaging apparatus according to the present embodiment will be described with reference to FIG. 1.

As illustrated in FIG. 1 an imaging apparatus 10 according to the present embodiment includes an imaging optical system 101, a focus control unit 102, an imaging sensor 103, an image processing unit 104, a distance information generation unit 105, a memory 106, a recording processing unit 107, a recording medium 108 and a ROM 109. The imaging apparatus 10 also includes a system control unit 110, a display processing unit 111, a display unit 112, a position detection unit 113, a touch panel 114 and a bus 115.

The imaging sensor 103 is a solid-state imaging device, such as a CMOS sensor, and is configured to acquire an image of an object (hereinafter, also referred to as "object image"). A sensor for phase difference detection is embedded in the imaging sensor 103, and information of distance from the object imaged based on a phase difference signal output from the imaging sensor 103 can, also be acquired. That is, the imaging sensor 103 also has functions as a distance information acquiring unit. The imaging optical system 101 is configured to form an optical image of the object on the imaging sensor 103 and includes a focus position control mechanism. The focus control unit 102 is a controller configured to control operation of the focus position control mechanism of the imaging optical system 101.

The distance information generation unit 105 is a circuit or a processor configured to calculate the information of distance from the object based on the phase difference signal output from the imaging sensor 103. The calculated distance information of the object is stored in the memory 106. The image processing unit 104 is a circuit or a processor configured to digitize an image signal output from the imaging sensor 103 to apply a predetermined process to the image signal. The processed image data is temporarily stored in the memory 106.

The memory 106 is an internal storage device including a semiconductor memory such as a DRAM. The memory 106 stores recording data generated by the recording processing unit 107, a program for controlling the imaging apparatus 10, and GUI (graphical user interface) data, such as images, characters and icons, displayed on the display unit 112.

The recording processing unit 107 is a circuit or a processor configured to read and convert the image data and the distance information of the object stored in memory 106 into a predetermined recording format and to write the data and the information in the recording medium 108. Although not particularly limited, the recording medium 108 can be, for example, a memory card using a non-volatile semiconductor memory such as an SD memory card.

The system control unit 110 is a control unit (CPU), a circuit or a processor that controls the entire imaging apparatus 10. The ROM (read-only memory) 109 is configured to store a control program, character fonts and icon resource data.

The display unit 112 includes a display device such as a liquid crystal panel. The touch panel 114 is mounted on a display surface, such as a liquid crystal panel, of the display unit 112. The display processing unit 111 is a circuit or a processor configured to execute a process of displaying a video stored in the memory 106 and information of icons and characters on the display unit 112.

The position detection unit 113 is a circuit or a processor configured to detect and output, to the system control unit 110, touch operation of the user on the touch panel 114 and the position pressed by the finger of the user.

The bus 115 is a path for connecting the modules to exchange data between the modules. The system control unit 110 transmits predetermined control signals to the modules through the bus 115 to control the entire imaging apparatus 10.

Before describing specific operation of the imaging apparatus 10 according to the present embodiment, an example of the distance information generated by the distance information generation unit 105 will be described with reference to FIGS. 2A and 2B.

FIG. 2A is a schematic diagram illustrating positional relationship between the imaging apparatus 10 and objects 210, 211 and 212. Distances from the imaging apparatus 10 to the objects 210, 211 and 212 are distances L1, L2 and L3, respectively.

As described, the imaging sensor 103 can divide and import signals of pixels of an imaging surface to acquire phase difference information for AF (auto focus) of each pixel. Based on the phase difference information acquired from the imaging sensor 103, the distance information generation unit 105 generates the information of distance to the object being imaged at predetermined resolving power. A well-known technique can be applied to generate the distance information based on the imaging surface phase difference detection, and the details will not be described here.

FIG. 2B is a schematic view of a distance map indicating the acquired distance information by two-dimensional image information (map information). In a distance map 215 of FIG. 2B, the taken image is divided into 9×9 unit areas, and the unit areas are colored in different patterns corresponding to the distances to the object. Distance data 220, 221 and 222 are data indicating distances from the objects 210, 211 and 212 of FIG. 2A. The right side of FIG. 2B illustrates relationship between the patterns of the areas in the distance map 215 and the distance from the imaging apparatus to the objects.

The distance data can be detected for each pixel of the imaging sensor 103. However, to improve the processing performance, a distance map allocating one distance data to every N×N pixels of the imaging sensor 103 can be generated in an initial state, for example. When the total number of pixels of the imaging sensor 103 is H×V, the resolving power of the distance map in the initial e is (H/N)×(V/N). The resolving power of the distance map 215 can be changed in the setting of the system control unit 10.

The format of the distance data indicated on the distance map 215 is not limited to the example described above, and data in an arbitrary format can be used as long as the data indicates the distances between the imaging apparatus 10 and the objects.

The distance map data generated by the distance information generation unit 105 is temporarily stored in a predetermined area of the memory 106. The system control unit 110 controls the recording processing unit 107 to convert the distance map data into a predetermined recording format along with the image data stored in the memory 106, and the data is recorded in the recording medium 108. The image data and the distance map data are generated based on signals at the same timing in the imaging sensor 103.

Operation of the imaging apparatus according to the present embodiment will be described with reference to FIGS. 3 to 10B.

The imaging apparatus 10 according to the present embodiment can be controlled according to, for example, the low chart illustrated in FIG. 3.

In step S301, power is applied through an operation unit not illustrated, and the operation of the imaging apparatus 10 is started.

In step S302, an object image during imaging that enters the imaging sensor 103 through the imaging optical system 101 is converted by the imaging sensor 103 into an electrical signal, and the electrical signal is input to the image processing unit 104. The image processing unit 104 applies predetermined image processing to the image data, and the processed image data is stored in the memory 106. The display processing unit 111 reads the image data stored in the memory 106, and the display unit 112 displays the image data.

The imaging sensor 103 also outputs a focus detection signal for AF (phase difference information described above), and the signal is input to the distance information generation unit 105. The distance information generation unit 105 generates a distance map based on the focus detection signal and stores the distance map in the memory 106.

In step S303, when touch operation for the touch panel 114 by a finger of the user or the like is detected, the touch panel 114 outputs a signal corresponding to the operation to the position detection unit 113. Examples of the signal output by the touch panel 114 include a signal indicating a pressed state of the finger and a signal indicating the position when the touch panel 114 is pressed.

The position detection unit 113 receives the signal according to the press from the touch panel 114 at a predetermined sampling rate. The position detection unit 113 outputs, to the system control unit 110, data indicating the pressed state of the touch panel 114 and data indicating a two-dimensional position on the screen of the display unit 112 when the touch panel 114 is pressed.

The system control unit 110 detects an operation state of the finger for the touch panel based on the data received from the position detection unit 113. Examples of the operation state of the finger include a state that the finger touches the touch panel 114 (hereinafter, referred to as "press"), a state that the finger is separated from the touch panel 114 (hereinafter, referred to as "un-press") and a state that the finger is moving while pressing the touch panel 114 (hereinafter, referred to as "move").

If the system control unit 110 determines that the operation state is "press", the process moves to step S304. On the other hand, if the operation state is not "press", the system control unit 110 waits for the next data from the position detection unit 113 in step S303.

In step S304, the system control unit 110 determines whether the operation state of the finger is "move" based on the data received from the position detection unit 113. As a result, if the system control unit 110 determines that the operation state of the finger is "move", the process moves to step S307.

In step S307, the system control unit 110 determines whether the object image displayed on the display unit 112 is in an enlarged display state. The enlarged display state is a state in which an area of part of the object image is enlarged and displayed in step S308 described later. As a result, if the system control unit 110 determines that the object image is in the enlarged display state, the enlarged display image is moved according to the moved amount and the direction. On the other hand, if the system control unit 110 determines that the object image displayed on the display unit 112 is not in the enlarged display state, the current state is held, and the process returns to step S302.

If the system control unit 110 determines that the operation state of the finger is not "move" in step S304, the process moves to step S305.

In step S305, the distance map data generated by the distance information generation unit 105 and stored in the memory 106 is analyzed. An analysis method of the distance map data in step S305 will be described with reference to FIGS. 4A to 5.

As illustrated in FIG. 4A, the screen during imaging (object image 401) displayed on the display unit 112 includes objects 403, 404 and 405. The distance map corresponding to the object image 401 is a distance map 402 illustrated in FIG. 4B. In the distance map 402, distance data 406, 407 and 408 indicate distances to the objects 403, 404 and 405, respectively.

When a finger 409 of the user presses the touch panel 114 mounted on the display unit 112 that displays the object image 401, the system control unit 110 detects the pressed position on the object image 401 through the touch panel 114 and the position detection unit 113. For example, a point A is the detected press position (hereinafter, referred to as "press position A") in the object image 401 of FIG. 4A.

The system control unit 110 sets a predetermined area P around the press position A. The area on the distance map 402 corresponding to the area P is an area 421 of FIG. 4B. In the example of FIG. 4B, the area 421 includes 25 unit areas, and the distance data indicating the distance information to the object image is associated with each unit area.

The system control unit 110 analyzes the distance data in the area 421 to generate a distance histogram as illustrated in FIG. 5. More specifically, the system control unit 110 compiles the numbers of unit areas in the area 421 for each distance indicated by the distance data and arranges the numbers of unit areas for each distance in ascending order from the minimum value to the maximum value of distance. For example, the numbers of unit areas corresponding to each distance in the area 421 of FIG. 4B are as illustrated in Table 1, and the numbers are converted into a graph to obtain the distance histogram illustrated in FIG. 5.

TABLE 1

| Distance | Degree |
| --- | --- |
| 0 m-1 m | 0 |
| 1 m-2 m | 7 |
| 2 m-3 m | 0 |
| 3 m-4 m | 13 |
| 4 m-5 m | 0 |
| 5 m-6 m | 0 |
| 6 m- | 5 |

In step S306, the system control unit 110 determines whether a focus point (AF point) can be confirmed based on the generated distance histogram.

The system control unit 110 first classifies the distance data into three distance patterns based on the generated distance histogram. A first pattern of the three distance patterns is a single peak pattern. A second pattern is a multi-peak pattern. A third pattern is single distance pattern.

These three distance patterns will be described with reference to FIGS. 6A to 6C. FIG. 6A is a schematic diagram of a distance histogram of the single peak pattern. As illustrated in FIG. 6A, the single peak pattern includes data section indicating a single peak, and a proportion of a degree of the data section indicating the single peak in the entire data is smaller than a predetermined value. Therefore, a considerable number of distance data other than the single peak is also included in this case. FIG. 6B is a schematic diagram of a distance histogram of the multi-peak pattern. As illustrated in FIG. 6B, the multi-peak pattern includes a plurality of data sections indicating peaks. FIG. 6C is a schematic diagram of a distance histogram of the single distance pattern. The single distance pattern includes a data section indicating a single peak, and a proportion of a degree of the data section indicating the single peak in the entire data is greater than the predetermined value. Therefore, this case includes few distance data other than the single peak.

The following method can be used for the peak detection in the distance histogram, for example. However, the method of the peak detection is not limited to the following method, and other well-known methods can also be used.

The system control unit 110 first calculates an average value of the degrees in the distance histogram. For example, a degree M is the average value in the distance histogram of FIG. 7. The system control unit 110 then calculates a difference between the degree of each distance and the average value M. The system control unit 110 detects that the distance is a peak if the difference is equal to or greater than a predetermined value. For example, if the degree M of average and a predetermined value D of difference are values as illustrated in the example of FIG. 7, the distance (3 m to 4 m) with a degree equal to or greater than (M+D) s detected as a peak.

As a result of the peak detection, if the detected pattern is the single distance pattern, it is determined that the AF point is confirmed. The distance information of the data section corresponding to the detected peak is stored in the system control unit 110, and the process moves to step S309.

On the other hand, if the detected pattern is one of the single peak pattern and the multi-peak pattern, the system control unit 110 determines that the AF point is not confirmed, and the process moves to step S308. In step S308, a process of enlarging part of the image to display the image again is executed to confirm the AF point.

The process executed when the determined pattern is the single peak pattern as a result of the peak detection in step S306 will be described with reference to the schematic diagrams of FIGS. 8A and 8B. FIG. 8A is a schematic diagram of s distance map, and FIG. 8B is a distance histogram generated based on the distance map of FIG. 8A.

In a distance map 600 of FIG. 8A, an area 602 is an area set by the system control unit 110 around a point pressed by a finger of the user in selecting the AF point. FIG. 8B illustrates a distance histogram generated by the system control unit 110 based on distance data of unit areas in the area 602.

The system control unit 110 uses the distance histogram of FIG. 8B to detect the above peak pattern, and as a result, the detected peak pattern is a single peak pattern with a peak 601.

When the single peak 601 is detected, the system control unit 110 extracts the unit area indicating the data section (3 m-4 m) corresponding to the peak 601 from the distance snap 600 and calculates a center of gravity of the extracted unit area. The system control unit 110 sets a cut area around the calculated center of gravity. In this case, a cut size is calculated such that a proportion of the unit area indicating the distance information corresponding to the data section of the peak 601 in the cut area is about a predetermined value, such as about 50%. In the example of FIG. 8A, the system control unit 110 sets a cut area 603 indicated by a dotted line.

The process executed when the determined pattern is the multi-peak pattern as a result of the peak detection in step S306 will be described with reference to the schematic diagrams of FIGS. 9A and 9B. FIG. 9A is a schematic diagram of distance map data, and FIG. 9B is a distance histogram generated bayed on the distance map data of FIG. 9A.

FIG. 9A illustrates the distance map 402 corresponding to the image 401 during imaging illustrated in FIG. 4A, and an area 421 is an area set by the system control unit 110 according to the press position A. FIG. 9B illustrates a distance histogram generated by the system control unit 110 based on distance data of unit areas in the area 421. The distance histogram of FIG. 9B is classified into the multi-peak pattern with a plurality of peaks 701 and 702.

When the multi-peak pattern is detected, the system control unit 110 extracts the unit areas indicating the data section (1 m-2 m) corresponding to the peak 701 and indicating the data section (3 m-4 m) corresponding to the peak 702 from the distance map data. The system control unit 110 calculates a center of gravity of the extracted unit areas and sets a cut area around the calculated center of gravity. In this case, a cut size is calculated such that a proportion of the unit areas indicating the distance information corresponding to the data sections of the peaks 701 and 702 in the cut area is about a predetermined value, such as about 50%. In the example of FIG. 9A, the system control unit 110 sets a cut area 704 indicated by a dotted line.

After the cut area is set in this way, the process returns to step S302, and an enlarged image is displayed. More specifically, the system control unit 110 issues an instruction to the display processing unit 111 to read the data corresponding to the cut area from the image during imaging stored in the memory 106 to execute an enlargement process. The display processing unit 111 applies the enlargement process to the data read from the memory 106 and outputs the data to the display unit 112. As a result, part of the image during imaging corresponding to the area 603 is enlarged and displayed on the display unit 112.

Whether to confirm the AF point or to display the enlarged image can be automatically determined according to the peak pattern of the distance histogram, and this can eliminate a step by the user enlarging a desired position to a desired size by performing pinch-out operation or the like on the screen. Particularly, performing the pinch-out operation or the like while holding the imaging apparatus is cumbersome and troublesome, and the method of the present embodiment is significantly useful.

FIG. 10A illustrates an enlarged image when the determined pattern is the multi-peak pattern, and the image corresponding to the area 704 of FIG. 9A is enlarged. An enlarged image 801 includes an object 802 and an object 804.

After the enlarged image is displayed on the display unit 112 in step S302, the process described above is applied to the enlarged image in the following steps. More specifically, when the user touches the object 802 in the enlarged image 801 by a finger, the press of the touch panel is detected in step S303. In step S304, the system control unit 110 detects whether the operation is move operation. In step S305, distance map data of the pressed area is analyzed.

In the example of FIG. 10A, a distance map corresponding to an area 803 is analyzed. FIG. 10B illustrates a schematic diagram of the distance histogram detected in the area 803.

In step S306, the system control unit 110 analyzes the peak pattern of the distance histogram detected in the area 803. The distance histogram of FIG. 10B includes a single peak, and the proportion of the degree of the distance of the peak in the entire data is greater than a predetermined number. Therefore, it can be determined that the pattern is the single distance pattern, and the distance in area 803 is substantially the same. As a result, the system control unit 110 determines that the AF point is confirmed and stores the distance information of the peak, and the process moves to step S309.

When the image of the set area is enlarged and displayed in step S308, it is desirable to acquire and display the image by controlling the focus to focus the enlarged object. For example, in the case of the single peak pattern, the focus can be controlled according to the distance of the peak of the distance histogram, and the object positioned at the peak distance can be focused when the image is enlarged and displayed. In the case of the multi-peak pattern, the focus is adjusted according to the distance of the maximum degree among the plurality of peaks, and the object positioned at the peak distance of the maximum degree is focused in the image when the image is enlarged and displayed. As a result, the visibility can be improved in the selection of the AF point in the enlarged image.

In step S309, the system control unit 110 uses the stored distance information of the peak and issues an instruction of focus control to the focus control unit 102. The focus control unit 102 controls the imaging optical system 101 focusing at the instructed distance. As a result, an image focusing the object of the peak area can be acquired and displayed on the display unit 112.

In this way, when an object area to be focused is selected by touch panel operation in the imaging apparatus of the present embodiment, the object area is automatically enlarged and displayed in an appropriate size based on the distance data map. Therefore, the AF point can be simply and surely set. As a result, a convenient imaging apparatus with excellent usability can be realized.

Second Embodiment

An imaging apparatus and a method of driving the imaging apparatus according to a second embodiment of the present invention will be described with reference to FIGS. 11A to 12. The same constituent elements as in the imaging apparatus according to the first embodiment illustrated in FIGS. 1 to 10B are designated with the same reference signs, and the description will not be repeated or will be simplified.

Figure 11A:
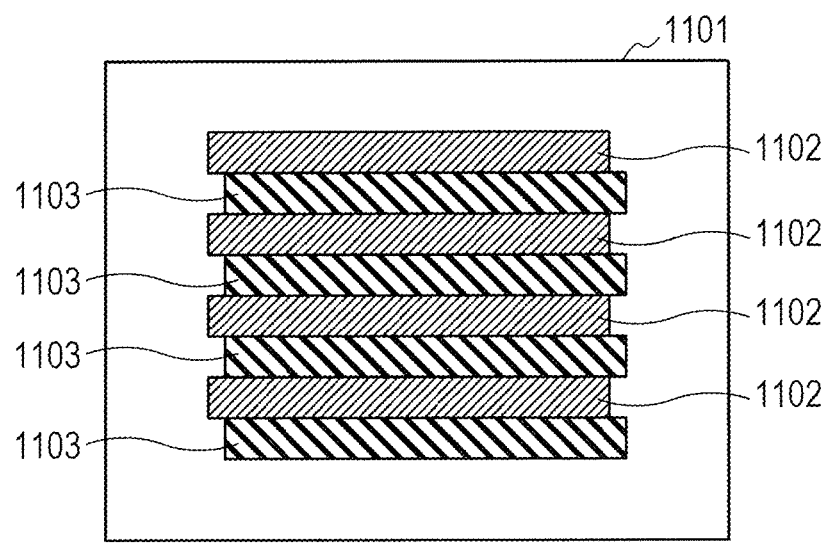
FIGS. 11A and 11B are diagrams describing an example of occurrence of perspective conflict in the AF point.
Figure 11B:
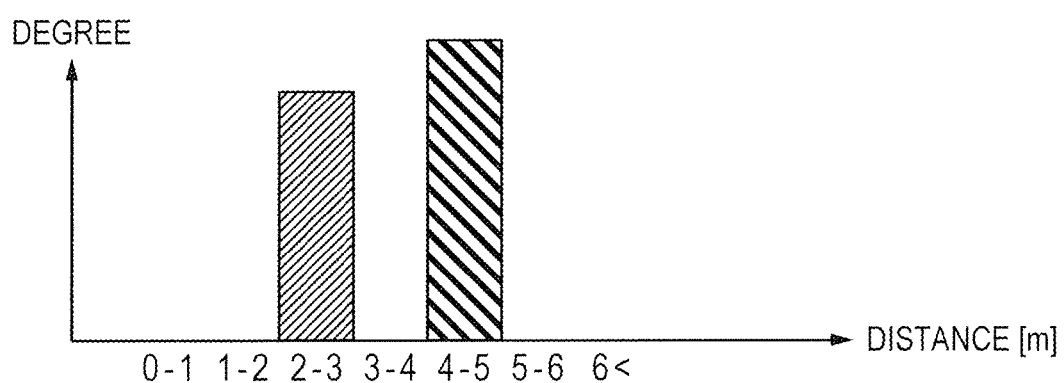

FIGS. 11A and 11B are diagrams describing an example of occurrence of perspective conflict in the AF point. FIG. 12 is a schematic view of a display screen indicating a method of controlling the imaging apparatus according the present embodiment of the present invention.

The method of controlling the imaging apparatus according to the present embodiment deals with a case in which selecting the AF point is difficult even in the enlarged image in the method of driving the imaging apparatus according to the first embodiment. A characteristic part of the method of driving the imaging apparatus according to the present embodiment will be described with reference to the drawings.

FIG. 11A is a schematic view illustrating an example of the enlarged image, and FIG. 11B is a schematic diagram illustrating an example of the distance histogram used to generate the enlarged image of FIG. 11A.

In FIG. 11A, four belt-shaped areas 1102 with dense hatching indicate an object corresponding to the peak positioned in a data section (2 m-3 m) of the distance histogram of FIG. 11B. Four belt-shaped areas 1103 with sparse hatching indicate an object corresponding to the peak positioned in a data section (4 m-5 m) of the distance histogram of FIG. 11B. In such a case, even if an attempt is made to press the enlarged image 1101 by a finger to set the AF point, accurately pressing and selecting one of the areas 1102 and the areas 1103 is difficult because the areas 1102 and 1103 are thin and adjacent to each other.

Therefore, a GUI is displayed on one of the operation unit not illustrated and the display unit 112 to allow the user to switch the display mode in the imaging apparatus according to the present embodiment.

Figure 12:
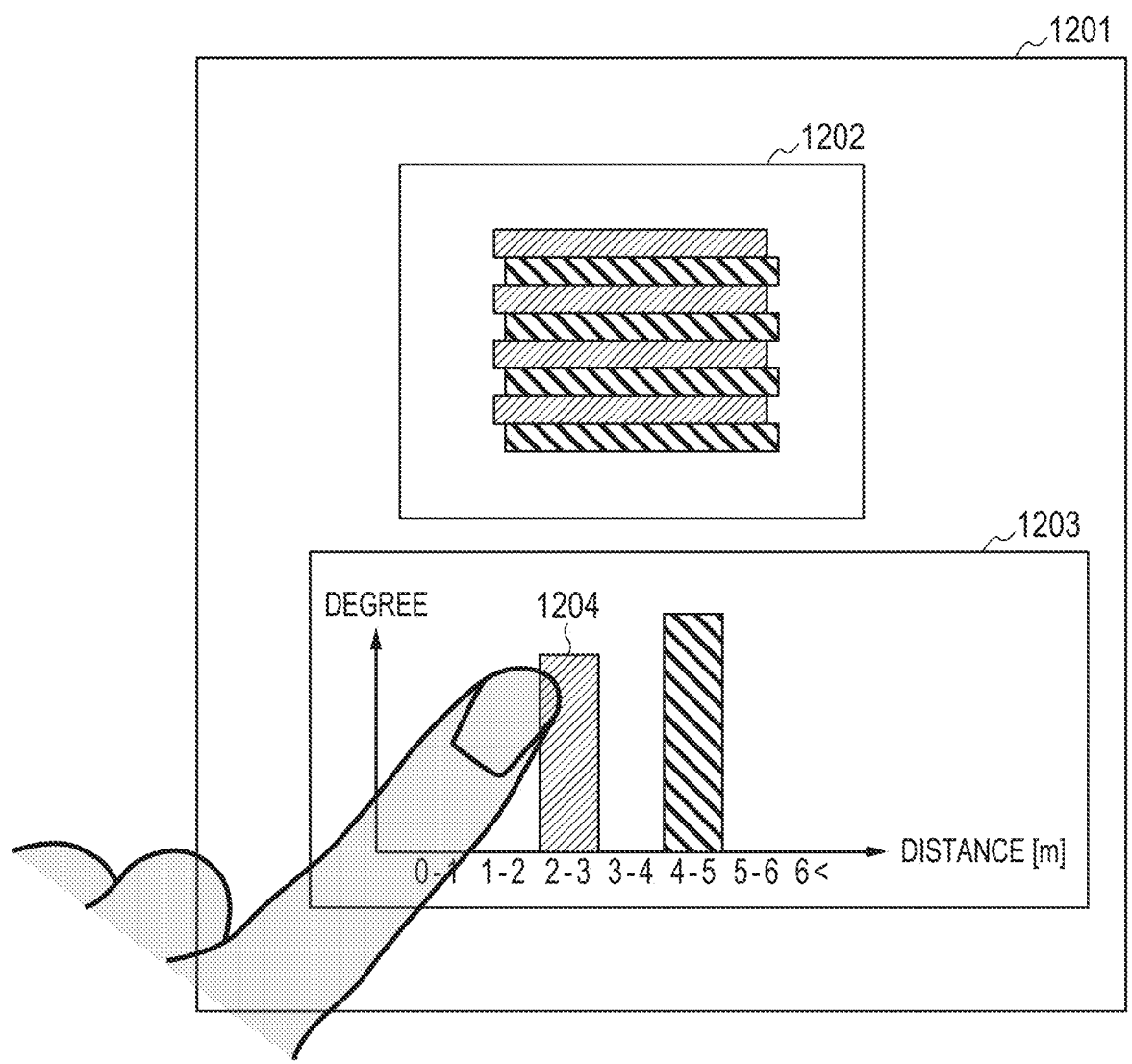
FIG. 12 is a schematic view of a display screen illustrating a method of controlling an imaging apparatus according to a second embodiment of the present invention.

For example, when the system control unit 110 detects operation of one of the operation unit and the touch panel 114 and further detects that the operation is operation of a display mode switching button, the system control unit 110 changes the display of the display unit 112 to a configuration such as in a screen 1201 of FIG. 12.

The screen 1201 includes an enlarged image 1202 and a distance histogram 1203. The enlarged image 1202 is an enlarged image (equivalent to the enlarged image 801) described in the first embodiment and is generated by the display processing unit 111. The distance histogram 1203 is a distance histogram that is a basis of the enlarged image. The system control unit 110 calculates the distance histogram data to generate GUI data as illustrated in FIG. 12 by using the calculated distance histogram data and stores the GUI data in the memory 106. The display processing unit 111 reads the GUI data stored in the memory 106 and displays the GUI data on the display unit 112.

The user can select the object by pressing the distance histogram 1203 instead of the enlarged image 1202. For example, to select the object of the area 1102 as an AF point, the user presses a data section 1204 of the distance histogram 1203 corresponding to the area 1102. In this way, a desired object can be easily selected as an AF point. The detection of the press position and the like are the same as in the first embodiment, and the description will not be repeated here.

The color and the pattern may be changed for each data section of the distance histogram 1203 as in FIG. 12, and the same color and pattern may be provided to the object positioned at the distance corresponding to each data section. In this way, the relationship between the data section of the distance histogram 1203 and the object of the enlarged image can be clearly indicated, and the user can easily designate the data section corresponding to the desired object.

In this way, according to the present embodiment, a desired object can be easily selected as an AF point even if perspective conflict occurs in the focus area selected by the user.

Third Embodiment

An imaging apparatus and a method of driving the imaging apparatus according to a third embodiment of the present invention will be described with reference to FIGS. 13A and 13B. The same constituent elements as in the imaging apparatus and the method of driving the imaging apparatus according to the first and second embodiments illustrated in FIGS. 1 to 12 are designated with the same reference signs, and the description will not be repeated or will be simplified.

Figure 13A:
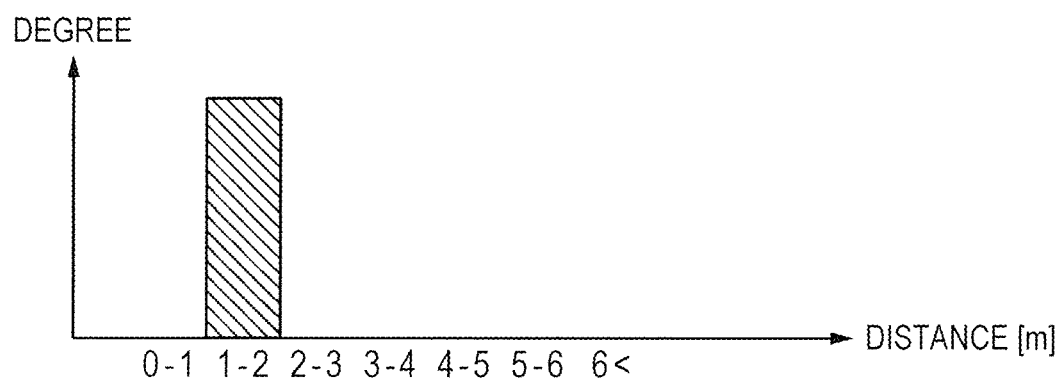
FIGS. 13A and 13B are diagrams illustrating an example of a distance histogram displayed in a method of controlling an imaging apparatus according to a third embodiment of the present invention.
Figure 13B:
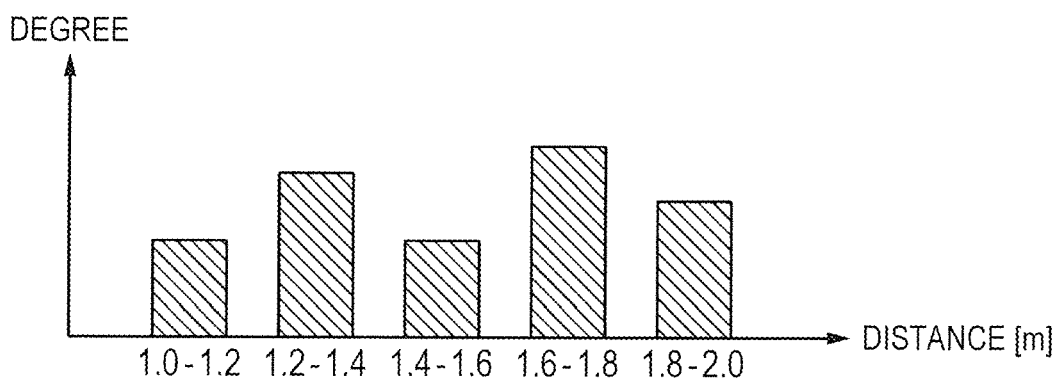

FIGS. 13A and 13B are diagrams illustrating an example of a distance histogram displayed in the method of controlling the imaging apparatus according to the present embodiment.

The method of driving the imaging apparatus according to the present embodiment deals with more accurate focusing, in which the accuracy of the distance map data is improved in stages.

In the method of driving the imaging apparatus according to the second embodiment, a GUI including the enlarged image 801 illustrated in FIG. 10A and including distance histogram (FIG. 13A) that is a basis of the enlarged image 801 is displayed on the display unit 112, for example.

In this case, the user selects the data section corresponding to the distance (1 m to 2 m) as an AF point according to the method of driving the imaging apparatus of the second embodiment. However, the user may desire to set the AF point based on a more accurate range. Therefore, the following process is executed to enable more accurate focusing in the method of driving the imaging apparatus according to the present embodiment.

When the system control unit 110 detects that the enlarged image 801 is pressed, the system control unit 110 displays the distance histogram of FIG. 13A as a GUI and measures the elapsed time from the start of the press.

If a data section of the distance histogram displayed as the GUI is pressed before the elapsed time from the press of the enlarged image 801 reaches a predetermined time, the process continues according to the driving method of the second embodiment.

If the press of the distance histogram is not detected before the elapsed time from the press of the enlarged image 801 exceeds the predetermined time, the system control unit 110 instructs the distance information generation unit 105 to set a smaller unit for the distance information to be generated. The distance information generation unit 105 regenerates the distance map data according to the newly set unit.

Based on the regenerated distance map data, the system control unit 110 generates a distance histogram with a higher resolution of data section.

FIG. 13B illustrates an example of the regenerated distance histogram. Although the data sections are divided on a basis of 1 m in the distance histogram of FIG. 13A, the data sections are divided on a basis of 0.2 m in the distance histogram of FIG. 13B, and the accuracy is five-fold.

The display processing unit 111 displays a GUI of the regenerated distance histogram on the display unit 112. The user can press a specific data section of the displayed distance histogram by a finger to focus a desired point of the object.

In this way, according to the present embodiment, the AF point can be set on a desired object at a higher accuracy.

Modified Embodiments

The present invention is not limited the embodiments, and various modifications can be made.

For example, the configuration of the imaging apparatus according to the first embodiment is just an example, and the imaging apparatus in which the present invention can be applied is not limited to the configuration illustrated in FIG. 1.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read, only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-011574, filed Jan. 23, 2015, which is hereby incorporated by reference herein in its entirety.

What is claimed is:

1. A focus control apparatus comprising:
   one or more processors; and
   a memory storing instructions which, when the instructions are executed by the one or more processors, cause the focus control apparatus to function as:
   an acquiring unit that acquires an image of objects captured by an imaging element and map information corresponding to distance information between the imaging element and the objects;
   a generation unit that generates a distance histogram based on the map information;
   a display control unit that displays, on a display unit, the image and, via a GUI (graphical user interface), the distance histogram generated by the generation unit and corresponding to the image, wherein the distance histogram includes a plurality of data sections, each data section having a degree and a touch area for selecting the respective data section, wherein each respective touch area has a size corresponding to the degree of the respective data section;
   a detection unit that detects a touch operation by a user, via the GUI, to one of the touch areas; and
   a setting unit that sets as a focus area, an area in the image indicating the distance information in the map information corresponding to the touch area detected in the touch operation.

2. The focus control apparatus according to claim 1, wherein the display control unit displays the image and the distance histogram simultaneously.

3. The focus control apparatus according to claim 1, wherein the display control unit displays the distance histogram in which the GUI is described differently for each data section.

4. The focus control apparatus according to claim 1,
   wherein the display control unit displays the distance histogram in which the GUI is described at different colors or patterns for each data section, and
   wherein, in the image, the display control unit provides the same color or patterns to the objects positioned at the distance corresponding to each data section.

5. The focus control apparatus according to claim 1, wherein the setting unit automatically sets an initial focus area based on a distribution of the distance histogram generated by the generation unit.

6. The focus control apparatus according to claim 1, wherein the generation unit is configured to regenerate the distance histogram with a different resolution.

7. The focus control apparatus according to claim 1, further comprising: a focus control unit that controls an operation of a focus position control mechanism of an imaging optical system leading optical images of the objects to the imaging element based on the focus area set by the setting unit.

8. The focus control apparatus according to claim 1, wherein the detection unit detects the touch operation by the user to the GUI.

9. A focus control method comprising:
   acquiring an image of objects captured by an imaging element and map information corresponding to distance information between the imaging element and the objects;
   generating a distance histogram based on the map information;
   displaying, on a display unit, the image and, via a GUI (graphical user interface), the distance histogram corresponding to the image, wherein the distance histogram includes a plurality of data sections, each data section having a degree and a touch area for selecting the respective data section, wherein each respective touch area has a size corresponding to the degree of the respective data section;
   detecting touch operation by a user, via the GUI, to one of the touch areas; and
   setting as a focus area, an area in the image indicating the distance information in the map information corresponding to the touch area detected in the touch operation.

* * * * *